United States Patent [19]

Nakaho

[11] 4,278,215
[45] Jul. 14, 1981

[54] WEBBING LOCK MECHANISM

[75] Inventor: Junichi Nakaho, Ichinomiya, Japan

[73] Assignees: Toyota Jidosha Kogyo Kabushiki Kaisha; Kabushiki Kaisha Tokai Rika Denki Seisakusho, both of Aichi, Japan

[21] Appl. No.: 88,360

[22] Filed: Oct. 26, 1979

[30] Foreign Application Priority Data

Mar. 27, 1979 [JP] Japan ............................ 54-404661[U]

[51] Int. Cl.³ ........................ A62B 35/02; B65H 75/48
[52] U.S. Cl. ................................. 242/107.2; 280/806
[58] Field of Search ....... 242/107.2, 107.4 R–107.4 E; 297/474–480; 280/801–808

[56] References Cited

U.S. PATENT DOCUMENTS

| 3,486,792 | 12/1969 | Stoffel ............................ 242/107.2 X |
| 3,504,867 | 4/1970 | Stevenson ........................ 242/107.2 |
| 3,817,473 | 6/1974 | Board et al. ...................... 242/107.2 |
| 4,120,466 | 10/1978 | Adomeit ........................... 242/107.2 |

Primary Examiner—John M. Jillions
Attorney, Agent, or Firm—Koda and Androlia

[57] ABSTRACT

Webbing lock mechanism comprising a wind-up shaft pivotally supported on a frame for winding up a webbing for restraining an occupant; a fixed base secured to the frame; a lock lever pivotally supported on the frame for being pivotally moved by tension of the webbing over a predetermined value; a lock member for approaching toward the base by being guided a window of the frame due to the force of pivotal movement of the lock lever so as to clamp the webbing; and approach limiting means provided on the fixed base and the clamping portion of the lock member on the side of the occupant for limiting the minimal distance of the lock member on the side of the occupant toward the fixed base.

6 Claims, 5 Drawing Figures

WEBBING LOCK MECHANISM

BACKGROUND OF THE INVENTION

1. Field of the Invention

This invention relates to a webbing lock mechanism for use in a seatbelt system for locking a webbing for restraining an occupant as necessary, and more particularly to a webbing lock mechanism in which the intermediate portion of the webbing is directly locked.

2. Prior Art

With the webbing lock mechanism used in a seatbelt system, even after the wind-off rotation of the wind-up shaft is locked, the condition of loosely wound-up webbing takes place before the webbing wound up to the wind-up shaft in layers is tightly wound up, thus causing a considerable amount of webbing to be extended out.

Then, there has been proposed a webbing lock mechanism as shown in FIG. 1, in which the intermediate portion of the webbing is directly locked by use of tensile force of the webbing when tension of the webbing is increased.

Namely, FIG. 1 is an explanatory view showing the condition of the conventional webbing lock mechanism being built in the webbing retractor 1. A frame 2 of the webbing retractor 1 is solidly secured to a vehicle body 4 by means of mounting bolts 3. A wind-up shaft 5 rotatably supported on the frame 2 winds up one end of a webbing 6 in layers, the other end of the webbing 6 is withdrawn to outside to reach an occupant restraining portion, and the wind-up shaft 5 is biased in the wind-up direction indicated by an arrow A in FIG. 1 by the biasing force of a spiral spring not shown. Further, a ratchet wheel 7 is secured to the wind-up shaft 5, and a pawl 8 being opposed to the ratchet wheel 7 and tiltably supported by the frame 2 is actuated by an acceleration sensor such as a pendulum not shown, and adapted to prevent the wind-off rotation of the webbing 6 through the mesh with the ratchet wheel 7.

Furthermore, secured to the lower portion of the frame 2 is a fixed base 9, at one side of which is provided a support shaft 10. A roller 11 around which the webbing 6 is wound is rotatably supported on the support shaft 10, on which is pivotally supported a lock lever 12. Provided at the forward end portion of the lock lever 12 is a support shaft 13, on which is rotatably supported a roller 14 around which the webbing 6 is wound. The intermediate portion of the lock lever 12 is formed into a lock portion 15. Inserted through a space between the fixed base 9 and the lock portion 15 is the intermediate portion of the webbing 6. During normal running condition of the vehicle, the webbing 6 is not clamped and smoothly slidable by the action of a leaf spring 16 for causing the lock portion 15 of the lock lever 12 to be separated from the fixed base 9, and in an emergency of the vehicle, such as a collision, the webbing wind-off rotation of the wind-up shaft 5 is suddenly stopped through the mesh between the pawl 8 and the ratchet wheel 7 due to the action of the acceleration sensor not shown, and the tension of the webbing 6 increased by the collision inertial force of the occupant makes the lock lever 12 to pivotally move about the support shaft 10, whereby the intermediate portion of the webbing 6 is clamped between the fixed base 9 and the lock portion 15 of the lock lever 12. Namely, the intermediate portion of the webbing 6 is directly locked, whereby the condition of loosely wound-up webbing 6 does not take place, so that the occupant can be placed under a condition uniformly restrained by the webbing 6.

However, in said conventional webbing lock mechanism, the lock portion 15 of the lock lever 12 approaches the fixed base 9 in rotating condition but not in parallelly moving condition, whereby the surface pressure caused in a space between the fixed base 9 and the lock portion 15 becomes non-uniform in the direction of the webbing being inserted. As the case may be, the webbing 6 is not perfectly clamped, and such problems may be encountered that the webbing 6 may slide or may be broken off by being firmly clamped only at a portion of the surface clamped by the fixed base 9 and the lock portion 15.

SUMMARY OF THE INVENTION

Accordingly, it is the general object of the present invention to provide a webbing lock mechanism wherein the intermediate portion of the webbing is positively and stably locked so that the occupant can be safely restrained.

In keeping with the principles of the present invention, the object is accomplished by a unique webbing lock mechanism comprising a wind-up shaft pivotally supported on a frame for winding up a webbing for restraining an occupant; a fixed base secured to the frame; a lock lever pivotally supported on the frame for being pivotally moved by tension of the webbing over a predetermined value; a lock member for approaching toward the base by being guided a window of the frame due to the force of the pivotal movement of the lock lever so as to clamp the webbing; and approach limiting means provided on the fixed base and the clamping portion of the lock member on the side of the occupant for limiting the minimal distance of the lock member on the side of the occupant toward the fixed base.

BRIEF DESCRIPTION OF THE DRAWINGS

The above-mentioned features and objects of the present invention will become more apparent with reference to the following description, taken in conjunction with the accompanying drawings, wherein like-referenced numerals denote like elements, and in which.

DETAILED DESCRIPTION OF THE INVENTION

Figure 1:
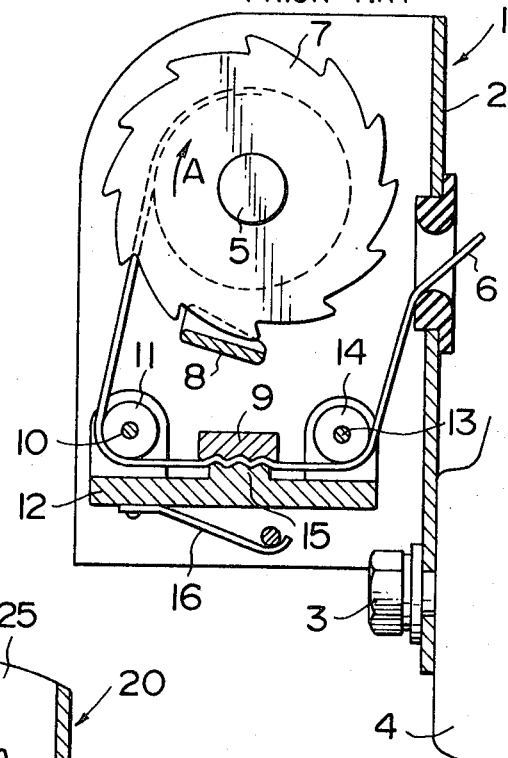
FIG. 1 is a cross-sectional view showing the webbing lock mechanism of the prior art.
Figure 2:
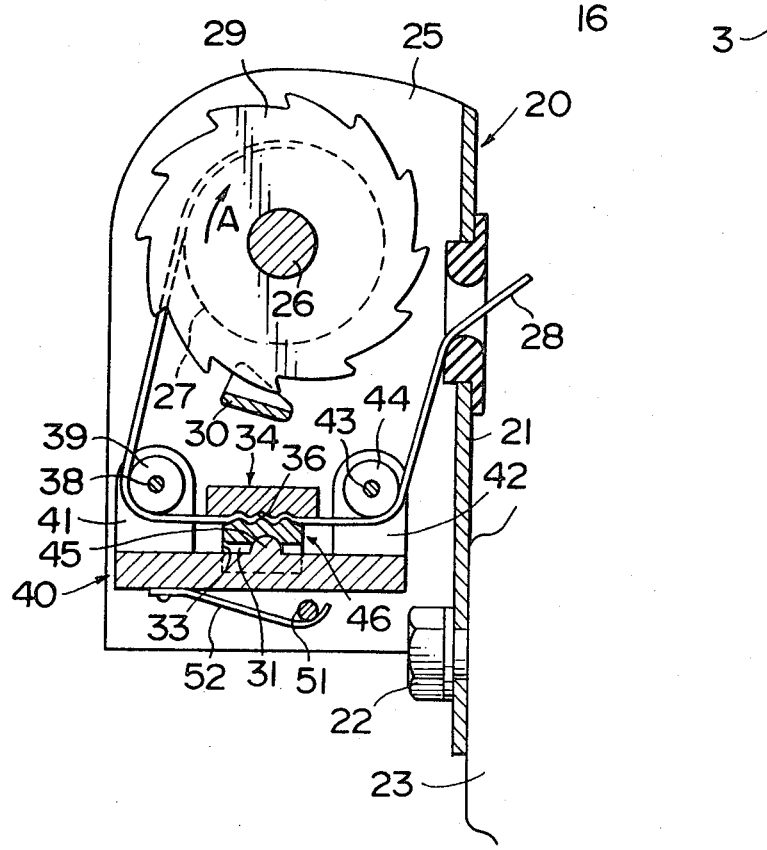
FIG. 2 is a cross-sectional view showing one embodiment of the webbing lock mechanism according to the present invention.
Figure 3:
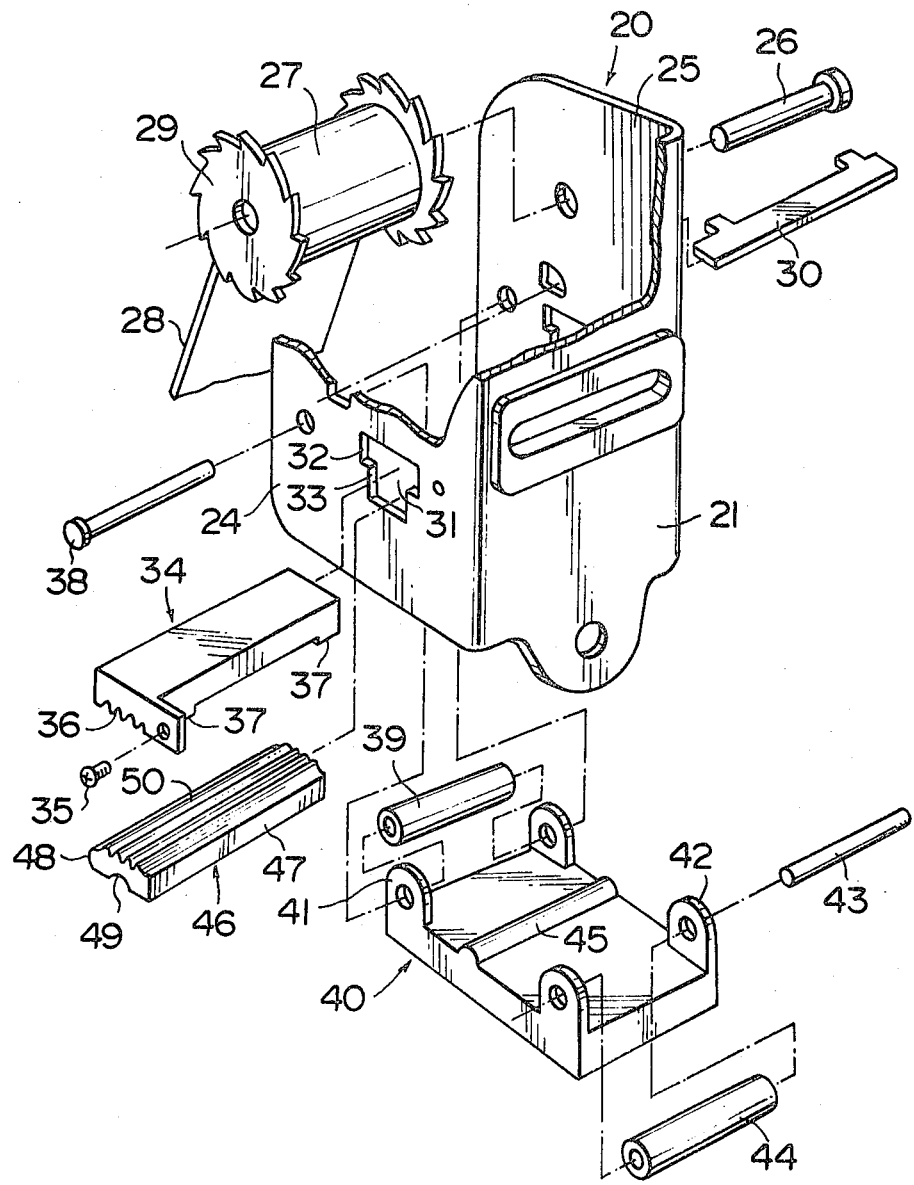
FIG. 3 is a disassembled oblique view of FIG. 2.

Referring more particularly to the drawings, shown in FIGS. 2 and 3 are explanatory views showing the webbing retractor 20 into which is built in one embodiment of the webbing lock mechanism according to the present invention. The webbing retractor 20 comprises a frame 21 wherein a thin plate is bent into a substantially letter 'U' shape, and secured to a vehicle body 23 through mounting bolt 22.

Secured to parallel side portions 24, 25 of said frame 21 are opposite ends of a support shaft 26 on which is pivotally supported a wind-up shaft 27. The wind-up shaft 27 winds up the webbing 28 for restraining the occupant around the outer periphery thereof in layers, and the webbing 28 is biased in the direction indicated by an arrow A in FIG. 2 by the biasing force of a spiral spring, not shown. The other end, not shown, of the webbing 28 is adapted to be withdrawn to the outside of the retractor 20 and reaches an occupant restraining portion.

A pair of ratchet wheels 29 are fixed on opposite side portions of the wind-up shaft 27 and opposed to a pawl 30 tiltably supported by the parallel side portions 24, 25. Said pawl 30 is actuated by an acceleration sensor, not shown, utilizing a pendulum for example, meshes with the ratchet wheel 29, and is adapted to prevent the webbing wind-off rotation (in the direction opposite to the direction indicated by the arrow A) of the ratchet wheel 29 and wind-up shaft 27.

Figure 4:
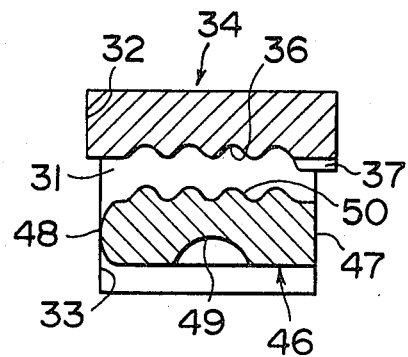
FIG. 4 is an enlarged sectional view showing the essential portions of FIG. 2.

Further, a letter 'T' shaped window 31 is cuttingly provided at the lower portion of the parallel side portions 24, 25 of the frame 21. The side of the head portion of the window 31 is made into a fixed portion 32, and the side of the leg portion thereof is formed into a guide portion 33. A fixed base 34 is coupled into and held by the fixed portion 32 of the window 31, and fixed base 34 is fixed on the parallel side portion 24 through a set-screw 35. The undersurface of the fixed base 34 is formed into a corrugated fixed lock portion 36 for serving as the locking surface for the webbing 28. Additionally, as clearly shown in FIG. 4, ribs 37 having a height of about the thickness of the webbing 28 and serving as the approach limiting means are downwardly projected from opposite side portions of the fixed base and are located at the end portion of the fixed base remote from the wind-up shaft, that is, the occupant's side said opposite side portions at both sides defining an area through which the webbing 28 is inserted.

A support shaft 38 is secured to the parallel side portions 24, 25 to one side of the position where the fixed base 34 is provided. Rotatably supported on the support shaft 38 is a roller 39 around which is wound the webbing 28. Said support shaft 38 projecting from the opposite sides of the roller 39 is inserted through bearings 41 provided at one side of a lock lever 40 to thereby pivotally support the lock lever 40. Secured to bearings 42 at the other side of the lock lever 40 is a support shaft 43 on which is rotatably supported a roller 44 around which is wound the webbing 28. A ridge 45 of a circularly arcuate shape in cross-section is formed in the crosswise direction on the upper surface of the intermediate portion of the lock lever 40.

Furthermore, a lock member 46 is received in the guide portions 33 of the windows 31 in a manner to be movable in opposed relation with the fixed base 34. The side portion of the lock member 46 at the side that is opposed to the ribs 37 of the fixed base 34 is formed into a planar portion 47 and brought into abutting contact with one of the guide portions 33. The other portion of the lock member 46 is formed into a convex portion 48 and brought into abutting contact with the other of the guide portions 33. Formed at the undersurface of the lock member 46 is a recessed portion 49 engageable with the ridge 45 of said lock lever 40. Formed at the upper surface of the lock member 46 is a corrugated movable lock portion 50 engageable with the fixed lock portion 36 of the fixed base 34. Secured through a rivet or the like to opposite side portions of the undersurface of the lock member 46 is one end of a leaf 52 engaged through an engaging pin 51 with the frame 21, whereby the lock member 46 is biased in the direction of being separated from the fixed base 34.

Description will now be given of operation of the abovedescribed embodiment. The biasing force of the spiral spring constantly acts on the occupant's side wind-up shaft 27, whereby said wind-up tensile force constantly acts on the webbing 28 wound off the wind-up shaft 27. In the case the occupant fasten the webbing 28 to himself, the webbing 28 is wound off against the wind-up biasing force by said spiral spring, and fastened to the occupant. Furthermore, in such a case as above, although the wind-up biasing force by the spiral spring is progressively increased along with the wind-off of the webbing 28, the biasing force by the leaf spring 52 which can counteract said rotational force acts on the lock lever 42. Hence, the interval between the fixed lock portion 36 of the fixing base 34 and the movable lock portion 50 of the lock member 46 is maintained in a manner the webbing 28 can be smoothly inserted therethrough.

In case where the occupant's side vehicle is fallen into an emergency such as collision, the occupant is violently thrown into the direction of the collision of the vehicle, whereby the webbing 28 is suddenly wound off the occupant's side wind-up shaft 27 to move. However, due to action of the acceleration sensor, not shown, the pawl 30 is urged up to be meshed with the ratchet wheel 29, whereby the wind-off rotation of the wind-up shaft is prevented. It follows that the tensile force of the webbing 28 suddenly increases, whereby the torque for rotating the lever 40 about the support shaft 38 through the roller 44 suddenly increases, and pivotally moves the lock lever 40 in the counterclockwise direction in FIG. 2 against the biasing force of the leaf spring 52.

By pivotal movement of the lock lever 40, the lock member 46 is guided by the guide portions 33 of the windows 31 to make upward parallel movement, and limited in its movement at a position where the opposite side portions on the occupant's side of the movable lock portion 50 thereof comes into abutting contact with the ribs 37 of the fixed lock portion 36. Thereupon, due to the turning force of the lock lever 40, the lock member 46 rotates about contact points thereof with the ribs 37 in a manner to slide the convex portion 48 thereof along the guide portions 33 in the clockwise direction in FIG. 2, thereby positively clamping the intermediate portion of the webbing 28 between the fixed lock portion 36 of the fixed base 34 and the movable lock portion 50 of the lock member 46.

As a result that the webbing 28 is locked between the lock base 34 and the lock member 46 as described above, tensile force of the webbing 28 is not applied to the wind-up shaft 27 any more, so that such possibility can be eliminated that the webbing 28 is wound off the retractor 20 due to the condition of loosely wound-up webbing as in the prior art, thus enabling to positively restrain the occupant to whom the webbing 28 is fastened.

With the webbing lock mechanism described in the preceding embodiment, the lock member 46 is guided by the guide portions 33 provided in the windows 31 of the frame 21 to approach the fixed base 34 in parallel movement, said approaching movement is interrupted by the presence of the ribs 37 having projecting height of about the thickness of the webbing 28 and formed at the opposite side portions of the area through which the webbing 28 is inserted, further the convex portion 48 of the lock member 46, while being guided by the guide portions 33 of the windows 31, rotates about the ribs 37 and moves toward the fixed base 34, whereby the clamping action becomes constantly uniform, thereby enabling to lock the webbing 28 in a stable condition. Furthermore, due to the presence of the ribs 37, the value of pressure urging the webbing 28 is 0 or very small at the occupant's side of the clamping portion between the fixed base 34 and the lock member 46, and the urging pressure therebetween is adpated to increase in the direction opposite to the ribs 37, i.e., toward the wind-up shaft 27, whereby the webbing 28 passes through a space formed between the corrugated fixed lock portion 36 and the movable lock portion 50 toward the wind-up shaft 27 to gradually decrease the internal tension thereof, whereby the webbing 28 is perfectly clamped which finally becomes low in tension to a certain extent, so that the webbing cannot be broken off and can be brought into a perfectly locking condition.

Figure 5:
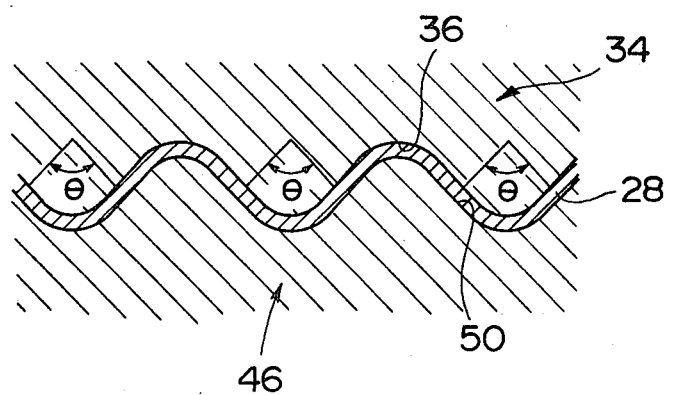
FIG. 5 is an enlarged side view showing the condition of the webbing being clamped.

By the experiments conducted by the present inventor, in general, the position of breakoff the webbing tends to take place at the occupant's side of the lock member. Hence, it is deemed that breakoff of the webbing can be extremely effectively prevented by this invention in which the locking condition at the occupant's side is relaxed. As shown in FIG. 5, the tension damping factor of the webbing inserted through the corrugated slit can be given by $$e^{-\mu n\theta}$$

wherein $n\theta$: the full contact angle between the webbing and the corrugated slit, n: the total number of the crests or troughs.

In this formula, if $\mu$ and $n\theta$ are substituted by 0.15 and 4.62 radian, then the tension of the webbing can be decreased to one half, and the increase of the full contact angle $n\theta$ of the webbing can increase the value of the tension damping factor in terms of exponential function.

As has been described so far, with the webbing lock mechanism according to the present invention, such advantages can be offered that the intermediate portion of the webbing is positively and stably locked, so that the occupant can be safely restrained.

It should be apparent to one skilled in the art that the above described embodiments are merely illustrative of but a few of the many possible specific embodiments of the present invention. Numerous and varied other arrangements can be readily devised by those skilled in the art without departing from the spirit and scope of the invention,

What is claimed is:

1. A webbing lock mechanism comprising:
a frame;
a wind-up shaft pivotably supported by said frame for winding up a webbing for restraining an occupant;
a fixed base fixed on the frame;
a lock lever pivotably supported by the frame to be pivotably moved by tensile force of the webbing exceeding a predetermined value in a direction of approaching the fixed base;
a window provided in said frame;
guiding portions provided in said window;
a lock member to be guided by said guiding portions of said window of the frame due to pivotal movement of the lock lever so as to approach the fixed base to clamp the webbing; and
approach limiting means provided at both sides of the fixed base and located at the end portion of the fixed base remote from the wind-up-shaft, said approach limiting means projecting toward the lock member for limiting a distance where the lock member approaches the fixed base nearly equal to the thickness of the webbing.

2. A webbing lock mechanism as set forth in claim 1, wherein a biasing member is provided for preventing the lock lever from oscillating toward the fixed base against the tensile force of the webbing lower than said predetermined value.

3. A webbing lock mechanism as set forth in claim 2, wherein a corrugated fixed locking portion is formed in said fixed base, and a corrugated movable locking portion relatively opposed to said fixed locking portion is formed on said lock member, said fixed and movable locking portions clamping the webbing therebetween.

4. A webbing lock mechanism as set forth in claim 3, wherein a projection having a circularly arcuate cross-section is formed on said lock lever, and a recessed portion engageable with said projection is formed on said lock member whereby said lock member is pivotably supported by said lock lever.

5. A webbing lock mechanism as set forth in claims 2, 3 or 4, wherein said approach limiting means are formed as ribs projecting from the fixed base and being of a height of about equal to the thickness of the webbing.

6. A webbing lock mechanism as set forth in claim 5, wherein one of the side portions of said lock member opposed to the rib formed on the fixed base is shaped to provide a planar portion and made to abut against one of the guiding portions of the window of the frame, and the other of the side portion of the lock member is shaped to provide a convex portion and made to abut against the other of guiding portions of the window of the frame.

* * * * *

UNITED STATES PATENT AND TRADEMARK OFFICE
CERTIFICATE OF CORRECTION

PATENT NO. : 4,278,215
DATED : Jul. 14, 1981
INVENTOR(S) : JUNICHI NAKAHO

It is certified that error appears in the above—identified patent and that said Letters Patent is hereby corrected as shown below:

At [30] Foreign Application Priority Data, before [U], delete "1".

Signed and Sealed this

Sixth Day of October 1981

[SEAL]

Attest:

GERALD J. MOSSINGHOFF

Attesting Officer

Commissioner of Patents and Trademarks